United States Patent
McDonnell

(10) Patent No.: US 9,052,849 B1
(45) Date of Patent: Jun. 9, 2015

(54) METHOD AND APPARATUS FOR DYNAMICALLY ADAPTING A PRINTING APPLIANCE TO A PRINTER

(71) Applicant: Marvell International Ltd., Hamilton (BM)

(72) Inventor: Philip McDonnell, Lake Forest, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/179,023

(22) Filed: Feb. 12, 2014

Related U.S. Application Data

(60) Provisional application No. 61/763,763, filed on Feb. 12, 2013.

(51) Int. Cl.
*G06F 15/00* (2006.01)
*G06F 3/12* (2006.01)

(52) U.S. Cl.
CPC .............. *G06F 3/1204* (2013.01); *G06F 3/123* (2013.01); *G06F 3/1292* (2013.01)

(58) Field of Classification Search
USPC ....................................................... 358/1.15
See application file for complete search history.

(56) References Cited

U.S. PATENT DOCUMENTS

2013/0293924 A1* 11/2013 Armstrong et al. .......... 358/1.15

* cited by examiner

*Primary Examiner* — Saeid Ebrahimi Dehkord

(57) ABSTRACT

Methods of determining a script to facilitate servicing a print request from a source device (e.g., a wireless mobile device) on a printer by a printing appliance are described. A printing appliance maintains a list of textual scripts that are mapped to a plurality of printers by a mapping relationship. For a given printer and requesting source device, if an appropriate script cannot be determined, the printing appliance will contact a server to resolve if a script on the printing appliance is an appropriate script, or whether the server should obtain and provide an appropriate script. A mapping relationship on the printing appliance is updated when an appropriate script is identified or provided by the server.

20 Claims, 4 Drawing Sheets

US 9,052,849 B1

METHOD AND APPARATUS FOR DYNAMICALLY ADAPTING A PRINTING APPLIANCE TO A PRINTER

CROSS REFERENCE TO RELATED APPLICATIONS

This claims priority to U.S. Provisional Patent Application No. 61/763,763, filed on Feb. 12, 2013, which is incorporated herein by reference.

BACKGROUND

Many existing printers are not configured for directly printing from a wireless mobile device in response to a print request wirelessly transmitted by the mobile device. Generally, to support printing of mobile content, a wired connection (e.g., a universal serial bus (USB) connection) between a computer and a wireless device is made so that content from a wireless mobile device can be downloaded onto a computer. Once downloaded, the content can be selected for printing. Consumers generally view this as a time consuming and tedious process.

Additionally, consumers often have a relatively large investment in their legacy printers, such as spare printer drums, spare toner/ink cartridges, as well as the printers themselves. Therefore, consumers would benefit from the ability to quickly, easily and affordably print content on their legacy printer anywhere from their wireless mobile devices.

SUMMARY

In various embodiments, the present disclosure provides a method and apparatus for a printing appliance to receive a command from a source device, wherein the command from the source device is for performing a print job on a printer connected to the printing appliance; determine whether a script used by the printing appliance to perform the print job on the printer is mapped to the printer; in response to determining that the script used by the printing appliance to perform the print job is not mapped to the printer: access a server to (i) obtain, from the server, the script used by the printing appliance to perform the print job on the printer or (ii) identify the script stored on the printing appliance used by the printing appliance to perform the print job on the printer; and update a mapping relationship, wherein the mapping relationship maps the script to the printer.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

The present disclosure describes techniques for dynamically adapting a printing appliance to unknown printers. In various embodiments, printer formatting logic and details are dynamically placed in script code (e.g., a European Computer Manufacturers Association (ECMA) Script, JavaScript), which are handled as text files stored, for example, in the non-volatile storage of the printing appliance. If a printing appliance does not possess appropriate script code for a given printer, the printing appliance will contact a server to obtain or identify appropriate script code, and a corresponding mapping between the given printer and the appropriate script code. As an example, the printing appliance allows users to wirelessly print mobile content from their wireless mobile devices (e.g., smart mobile devices) to a given printer.

Figure 1:
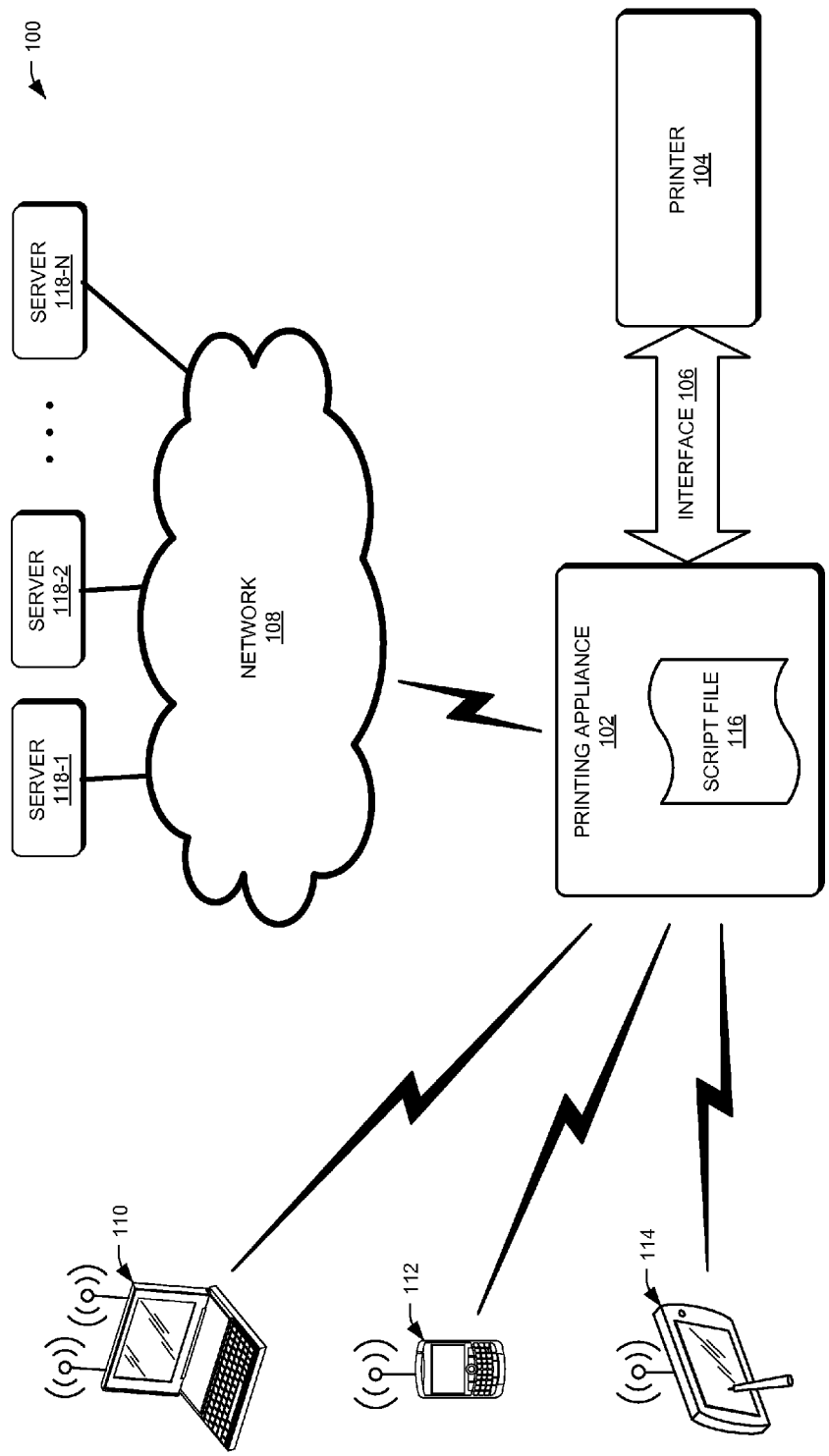
FIG. 1 is an example environment for illustrating operation of a printing appliance.

FIG. 1 illustrates an example environment 100 in accordance with various embodiments of the present disclosure. Example environment 100 includes a printing appliance 102 shown connected to a printer 104 via an interface 106. Printer 104 can include a wide variety of digital printers and/or multi-function devices for printing, as well as copying, scanning and/or faxing. Printer 104 can, for example, accept print jobs in one or more of a variety of formats. Generally, most of the formats are standardized, however, some formats are custom and/or proprietary.

Interface 106 can be a wireless interface (e.g., IEEE 802.11 (Wi-Fi), Bluetooth, etc.) or a wired interface (e.g., universal serial bus (USB), parallel printer port, etc.). Printing appliance 102 is directly or indirectly connected to a network 108 (e.g., the Internet, an intranet, local network, etc.) via a wired or wireless interface. As an example, network 108 can include a local network that connects printing appliance 102 to an intranet, the Internet or other network.

Printing appliance 102 allows numerous devices, such as devices 110, 112 and 114 (e.g., smart wireless mobile devices, smart phones, tablets, laptops, smart wearable and/or implanted devices, wired desktop computers, other smart devices, and the like) to access printer 104 for printing or other functions (e.g., copying, scanning and/or faxing). In various embodiments, printing appliance 102 supports printing on printer 104 from traditional computing hardware such as laptops and desktops through, for example, a USB pass-through mode. Additionally, wireless mobile devices can connect to printing appliance 102 over, for example, Wi-Fi (e.g., IEEE 802.11x), allowing users to easily print their content directly from their wireless mobile devices on printer 104.

Printing appliance 102 is configured to dynamically adapt itself to properly operate with a wide variety of printers to support printing from a wide variety of source devices. As an example, a new printer 104 with a new standard protocol or format could become available after printing appliance 102 has already been manufactured and deployed. Printing appliance 102 is configured to dynamically adapt itself to a printer whose details were not known when printing appliance 102 was manufactured or deployed. Conversely, printer 104 could be a relatively older printer that does not support a modern standard protocol or format, or printer 104 could support a format that does not work properly with various modern smart mobile devices. Moreover, printer 104 could have uncommon manufacturer or device idiosyncrasies that are not widely known.

To support a wide variety of printers, printing appliance 102 can determine a type of printer 104 via, for example, interface 106 (e.g., via IEEE 1284 stream, vendor identifier (VID), product identifier (PID), and/or the like), and self configure itself to operate with the determined printer. As such, printing appliance 102 dynamically configures itself to send print jobs to a wide variety of printers from a wide variety of source devices.

Thus, printing appliance 102 enables users to add a broad range of wireless connectivity and mobile printing functionality to any printer, and allows users to easily print content from smart mobile devices, desktops and other smart devices on existing printers, reducing waste and preserving investment in existing printers and consumables.

As an example, to support printing between a wide variety of source devices, and a wide variety of printers, printing appliance 102 utilizes printer formatting logic and details in dynamically executed script code (e.g., a European Computer Manufacturers Association (ECMA) Script, JavaScript), that can be stored as a script in a script file 116, for example, in non-volatile storage of printing appliance 102. As an example, script file 116 includes text files that are mapped via mapping relationships to various printer types, makes and models. In various embodiments, script file 116 contains mapping relationships and scripts for a variety of printers. Scripts can be mapped to printers in one-to-one, one-to-many or a many-to-one relationships between scripts and printers, depending on the specifics of a given printer. In various embodiments, scripts are mapped to printers, as well as source devices that transmit commands to the printing appliance to perform a print job on a printer connected to the printing appliance. Thus, printing appliance 102 identifies a source device that has sent printing appliance 102 a print command to print content on the source device to printer 104, and printing appliance 102 identifies or obtains a script that is appropriate to the source device and printer 104 to service the print command.

As an example, script file 116 includes a set of scripts (e.g., textual scripts), denoted by S. The scripts in S provide, for example, the ability to print a color or monochrome image (e.g., raster image) on a set of known printers P. Script file 116 further includes a mapping, denoted by D, such that $D:P \rightarrow S$. Thus, the mapping D maps scripts in S to known printers P. Therefore, D provides a mapping relationship between scripts and printers.

As an example, after a given printer $p \in P$ is plugged in to printing appliance 102, printing appliance 102 can use available standard bus identification techniques, as discussed above, to determine p (e.g., printer vendor, printer type, make, model, custom configurations, and/or the like). The mapping relationship D is then used to find at least one script $s \in S$ that corresponds to the given printer p. Upon a successful mapping, printing appliance 102 uses the script s to generate output (e.g., perform a print job for a source device) on the printer p.

Conversely, as an example, in response to a given printer $u \notin P$ being plugged in to printing appliance 102, heuristics and/or other processing techniques are performed by printing appliance 102 to determine if there exists an appropriate script $v \in S$ in script file 116 that can be used to allow for printing on the given printer u. However, since printer u is not mapped in script file 116 (e.g., u is not known by printing appliance 102), printing appliance 102 may not know which script to map to printer u to generate output on printer u.

Let t be a script that either exists in script file 116, or can be created and/or obtained, such that script t can be used by printing appliance 102 to generate output on printer u. However, if script t does not currently reside in script file 116, then a mapping between script t and printer u may also not currently reside in script file 116. Additionally, script t can reside in script file 116, however, printing appliance 102 may not know a mapping between script t and printer u, because mapping relationship D does not currently contain a mapping relationship between script t and printer u.

As an example, for a given printer, for the case where printing appliance 102 cannot resolve whether it possesses an appropriate script, or an appropriate mapping to an appropriate script, printing appliance 102 accesses a server M, such as one of servers 118-1, 118-2 to 118-N via network 108. Printing appliance 102 provides (or server M accesses) information that printing appliance 102 has obtained from the given printer to identify the given printer to server M.

If an existing script $v \in S$ is already present in script file 116 in printing appliance 102, and assuming that server M has been updated to know that script v will work for printer u, then server M fulfills the role by, for example, providing the updated mapping between script v and printer u to printing appliance 102. As another example, the act of server M identifying script v causes printing appliance 102 to update the mapping between script v and printer u. Thus, only the mapping D (e.g., in script file 116) is updated on or by printing appliance 102 to map script v to printer u.

In an example case that no such script $v \in S$ is already present in script file 116 on printing appliance 102, the server M provides a new script t to printing appliance 102. In various embodiments, server M also provides information for updating the mapping D on or by printing appliance 102 to map script t to printer u. In various other embodiments, knowing that new script t is associated with printer u, printing appliance 102 updates the mapping D to map script t to printer u.

In an example case where printing appliance 102 contacts server M regarding printer u, and 1) script t doesn't exist, 2) server M hasn't been updated to include script t and/or 3) server M hasn't been updated to include information pertaining to a mapping between script t and printer u, server M is alerted of a need to obtain script t and a corresponding mapping to printer u. As an example, at some point after obtaining script t and the corresponding mapping between script t and printer u, server M provides script t and optionally the corresponding mapping between script t and printer u to printing appliance 102, such as in response to a subsequent access of server M by printing appliance 102 regarding printer u. As another example, knowing of the previous failed attempt to provide script t to printing appliance 102, upon obtaining script t and/or its associated mapping to printer u, server M contacts printing appliance 102 and provides script t and optionally the corresponding mapping between script t and printer u to printing appliance 102. Over time, based on access or requests to server M from numerous printing appliances, server M builds a knowledge base of script files and their corresponding mapping to various printers.

Once server M (e.g., servers 118-1 through 118-N) is updated with script t and its mapping to printer u, a whole collection of deployed printing appliances will have access to script t and its mapping to printer u via access to server M. As illustrated in FIG. 1, server M need not be a single server, but could be a redundant collection of servers. The number of servers 118-1 through 118-N could be a very small fraction of the number of deployed printing appliances.

The set of all scripts, like those in script file 116 on printing appliance 102 and those scripts on servers 118-1 through 118-N, are not constrained to be just for classes of printers. Rather, the granularity of a given script can be down to a specific configuration of a given printer model and/or version, assuming printing appliance 102 can identify printer 104 to that level of granularity. The set of all scripts can also contain scripts that are specific to various source devices as well as various printers. As such, the full set of these textual scripts could get very large.

In various embodiments, the mapping D implements an updatable script. In these various embodiments, the mapping D is not constrained to be, for example, a simple dictionary lookup. Rather, the mapping D contains more sophisticated logic, increasing the likelihood that printing appliance 102 could determine a useful script without server assistance. As an example, for a given vendor ID (VID) and product ID (PID) combination obtained from printer 104 by printing appliance 102 via interface 106, mapping D contains logic for identifying an appropriate script associated with the VID-PID combination from a plurality of scripts associated with the VID, (as well as logic for identifying an appropriate script associated with a source device that requests printing on printer 104).

Using server M to update printing appliance 102 with scripts and/or mappings differs from a remote update of the software and/or firmware on printing appliance 102. Updating scripts and/or mappings does not require a change to the executable machine code running on printing appliance 102. Changing executable machine code running on printing appliance 102 could cause printing appliance 102 to stop working, as events like power loss, communication loss or data corruption can leave printing appliance 102 with corrupt and non-functional machine code.

As an example, when a new script is provided to printing appliance 102 from server M, the new script is tested by printing appliance 102, for example, by printing appliance 102 determining that it has received any error codes or similar messages via interface 106. Printing appliance 102 purposefully ignores the new script if it does not work. In various embodiments, printing appliance 102 notifies server M that the new script does not work, so that server M provides a different script, or a re-transmission of the new script. This goes beyond mere error detection of the data transfer of a script. This is because if there is an error in the logic of the script, and the script is correctly transmitted from server M to printing appliance 102, printing appliance 102 is configured to discover the error in the script. Printing appliance 102 invokes appropriate error handling of the script, for example, by ignoring the script or obtaining a different script from server M. In contrast, if updated machine code that incorporated the script was provided to printing appliance 102, printing appliance 102 would have a much more difficult task identifying errors in the script, and replacing the script with a different script that is free from errors. This is because printing appliance 102 would have to take measures to change or obtain new machine code.

In various alternate embodiments, a database of scripts and/or associated mappings between scripts and printers can be maintained in storage (not shown) that is external to printing appliance 102. Contemporary computer operating systems have historically devoted vast amounts of internal storage to a large body of printer drivers. By externally storing scripts and mappings, printing appliance 102 can access external storage to obtain and store only the most relevant scripts and mappings in script file 116.

Using the techniques described herein, printing appliance 102 can dynamically adapt to new or different unknown printers over time, by obtaining scripts and/or mappings from servers when needed. Thus, a whole body of deployed printing appliances continue to properly operate over time, staving off obsolescence of the printing appliances.

Figure 2:
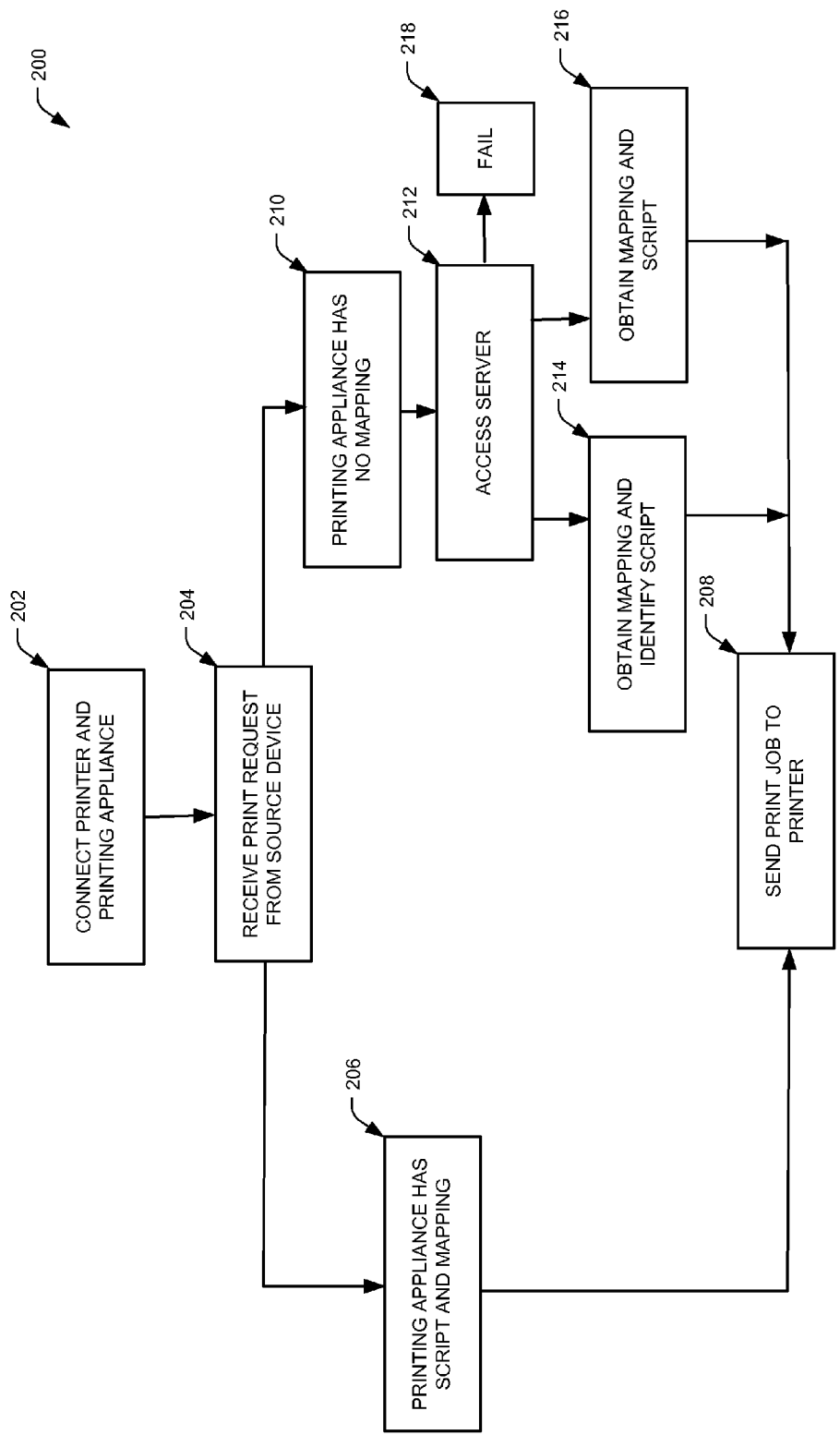
FIG. 2 is a block diagram illustrating use of a printing appliance.

FIG. 2 is an example diagram 200 illustrating various operational aspects of printing appliance 102. FIG. 2 is provided as an example of operational aspects of printing appliance 102, and is not meant to define a particular order of, or requirement for, each of the operational aspects.

At 202, printing appliance 102 is connected to a printer, such as printer 104. At 204, a print request is received from a source device, such as one of source devices 110, 112 or 114. At 206, printing appliance 102 determines that it has an appropriate script and mapping for printer 104. In various embodiments, printing appliance 102 would attempt to make this determination after connection to printer 104. However, in various alternate embodiments, a source device may require a particular script that may differ from a script required for other source devices, such that printing appliance 102 is required to determine whether it has an appropriate script and mapping for both printer 104, and a specific source device, such as one of source devices 110, 112 or 114.

At 208, if printing appliance 102 has determined that it has the appropriate script and mapping, and printing appliance 102 has received a print request from a source device, printing appliance 102 services the print request from the source device by using the script to process a print job at printer 104. At 210, printing appliance 102 determines that it does not have an appropriate mapping to a script to generate output on printer 104. Therefore, at 212, printing appliance 102 accesses a server, such as one of servers 118-1 to 118-N.

At 212, in response to accessing server 118, three different outcomes are illustrated in FIG. 2. As a first outcome, at 214, server 118 identifies an appropriate script on printing appliance 102, such as an appropriate script in script file 116. As an example, server 118 obtains information from printing appliance 102 regarding printer 104, script file 116 and optionally a source device associated with a print request. Server 118 then determines and identifies an appropriate script in script file 116. Server 118 provides printing appliance 102 the identity of the script and/or mapping information associated with the identified script. Server 118 and/or printing appliance 102 then update a mapping relationship (e.g., mapping D), stored on printing appliance 102, that maps the script to printer 104. At 208, if printing appliance 102 has received a print request from a source device, printing appliance 102 services the print request from the source device by using the script identified by server 118 to process a print job at printer 104 for the source device.

As a second outcome, at 216, server 118 provides an appropriate script and optional mapping information to printing appliance 102. As an example, upon determining that an appropriate script does not reside in script file 116, server 118 determines if it has an appropriate script file, and provides the script file to printing appliance 102. At 208, if printing appliance 102 has received a print request from a source device, printing appliance 102 services the print request from the source device by using the script to process a print job at printer 104 for the source device.

As a third outcome, at 218, server 118 fails to find an appropriate script file on itself or in script file 116 of printing appliance 102. As an example, if server 118 fails to find an appropriate script, server 118 is alerted of a need to obtain the appropriate script. As an example, printing appliance 102 generates a response indicating that alternate action may be required to receive an appropriate script. For example, printing appliance 102 attempts to obtain the appropriate script at a later time, after server 118 has had time to obtain the appropriate script. As an alternate example, server 118 notifies printing appliance 102 when an appropriate script has been obtained, or just provides printing appliance 102 the appropriate script and any information required to facilitate mapping.

Figure 3:
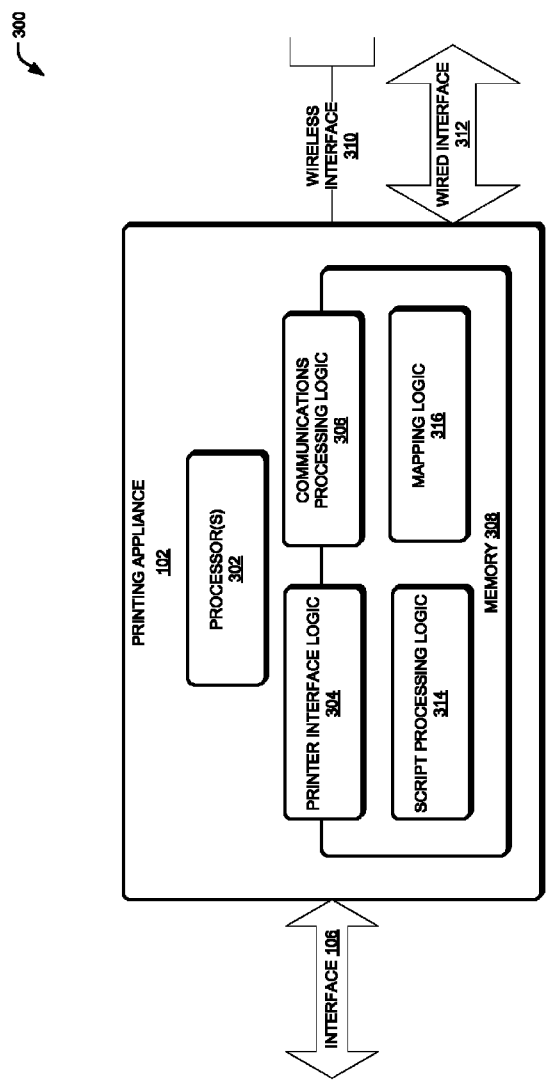
FIG. 3 is a block diagram illustrating various components of a printing appliance.

FIG. 3 is a schematic diagram of example architecture 300 for using various example components (e.g., logic) for implementing various features of printing appliance 102, as described herein. In various embodiments, printing appliance 102 includes various example components that include one or more processors 302, printer interface logic 304, communications processing logic 306 and memory 308. As an example, printer interface logic 304 and communications processing logic 306 can each be implemented as one or more of a system-on-chip (SoC), application-specific integrated circuit (ASIC), software in memory 308 that is executable by processors 302, combinations thereof, or the like. As an example, printer interface logic 304 and communications processing logic 306 can each include one or more of processors 302, and individual portions of memory 308 as internal memory and/or shared external memory. Additionally, printer interface logic 304 and communications processing logic 306 can utilize one or more processors 302 as external processor(s), and share portions of memory 308 as external memory.

In various embodiments, printer interface logic 304 facilitates interfacing between printer 104 and external user devices (e.g., devices 110, 112 and 114). As an example, printer interface logic 304 acts as an adapter to enable mobile printing functionality from source devices to printer 104 via interface 106. As such, printer interface logic 304 is configured to process a command received from a source device (e.g., devices 110, 112 and 114) to perform a print job on printer 104 associated with the source device.

Many existing printers pre-date Wi-Fi technology or do not support the evolving standards for printing from mobile devices. Printer interface logic 304 supports interfacing printer 104 to traditional computing hardware such as laptops and desktops, and allows mobile devices (e.g., smart phones, tablets, etc.) to connect to printing appliance 102 to allow users to easily print their mobile content.

Printer interface logic 304 is further configured to obtain and store information from printer 104 regarding a type, make, model, vendor, configuration, etc. regarding printer 104. Printer interface logic 304 is further configured to associate a mapping with a script, such as in script file 116, to service a print command from an external source device to process a print job on printer 104 for the external source device. Printer interface logic 304 is further configured to, upon obtaining information from printer 104 (as well as a type or configuration of source device making a print request), determine if an appropriate script is mapped to printer 104 (e.g., determine whether printer 104 is a known printer). If an appropriate script is not mapped to printer 104, printer interface logic 304 is further configured to facilitate communications with server 118 to obtain an appropriate script and/or script mapping for printer 104.

Communications processing logic 306 is configured to provide a variety of communications functions for printing appliance 102. As an example, communications processing logic 306 includes a wireless radio (e.g., IEEE 802.11), baseband processing circuitry and functionality, medium access controller (MAC) functionality, one or more central processing units (e.g., one or more of processors 302), memory, host interfacing functionality, antenna beamforming technology, and/or the like. Communications processing logic 306 is configured to control and manage connectivity with external devices, such as devices 110, 112 and 114, via wireless interface 310, as well as wired interface 312, to facilitate, for example, reception of print commands for processing by printer interface logic 304.

Additionally, communications processing logic 306 is configured to manage communications with server 118 to provide, for example, communications between printer interface logic 304 and server 118 via wireless interface 310, and/or wired interface 312.

Script processing logic 314 and mapping logic 316 are examples of components that are configured, for example, to work in conjunction with printer interface logic 304 to facilitate mapping of an appropriate script for servicing a print command from a source device for printing on printer 104, as described herein. In various embodiments, script processing logic 314 manages scripts in script file 116, and mapping logic 316 manages a mapping (e.g., mapping D) between scripts, printers and optionally, source devices.

As an example, script processing logic 314 is configured to determine if server 118 needs to be contacted to obtain a script, identify a script already stored or directly accessible by printing appliance 102, and manage relationships between obtained or identified scripts. As an example, script processing logic 314 provides script file 116 to server 118 so that server 118 can determine if script file 116 already contains an appropriate script. Mapping logic 316 processes and updates mappings obtained from server 118, or updates mappings based on script files obtained from, or identified by, server 118. In various embodiments, script processing logic 314 and/or mapping logic 316 are integrated into and/or with printer interface logic 304.

Memory 308 is an example of computer-readable storage media. Computer-readable media includes, at least, two types of computer-readable media, namely computer-readable storage media and communications media.

Computer-readable storage media includes volatile and non-volatile, removable and non-removable media (e.g., device) implemented in any method or technology for storage of information such as computer readable instructions, data structures, program modules, or other data. Computer-readable storage media includes, but is not limited to, RAM, ROM, EEPROM, flash memory, cache memory, or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer-readable storage media does not include communication media.

Figure 4:
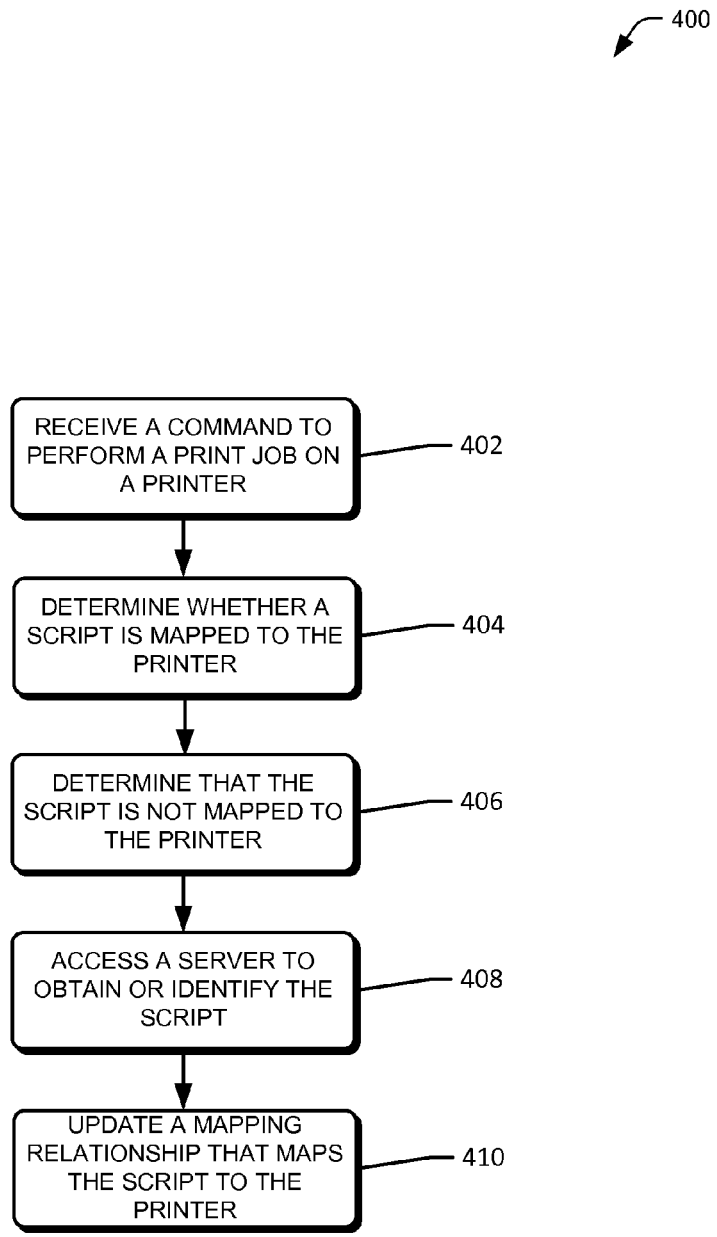
FIG. 4 is a block diagram illustrating an example method of operation of a printing appliance.

FIG. 4 illustrates an example method 400 for a printing appliance to perform a print job for a source device on a printer connected to the printing appliance.

At 402, a printing appliance receives a command from a source device to perform a print job on a printer connected to the printing appliance. As an example, the command from the source device is a wireless command that is wirelessly received by the printing appliance. As an example, the source device can see the printing appliance on a network, such as a local (e.g., wireless) network, because the printing appliance is discoverable on the local network.

At 404, a determination is made whether a script used by the printing appliance to perform the print job on the printer is mapped to the printer. As an example, printer interface logic 304, script processing logic 314 and/or mapping logic 316 determines if a script used by printing appliance 102 to perform the print job on printer 104 is mapped to printer 104. If a determination is made that the script used by the printing appliance is mapped to the printer, the script (e.g., a script stored in script file 116) is identified and used by the printing appliance to perform the print job on the printer. If a script is not mapped to the printer, server 118 will be contacted.

At 406, a determination is made that the script is not mapped to the printer. At 408, a server is contacted to obtain the script used by the printing appliance to perform the print job on the printer, or identify the script stored on the printing appliance and used by the printing appliance to perform the print job on the printer. At 410, a mapping relationship that maps the script to the printer is updated. As an example, printer interface logic 304, script processing logic 314 and/or mapping logic 316 updates a mapping (e.g., mapping D) to map an obtained or identified script to printer 104.

As an example, the script is a textual script. Also, as an example, the mapping relationship (e.g., mapping D) is stored on the printing appliance (e.g., in script file 116) wherein the printing appliance stores a plurality of scripts and the printing appliance stores the mapping relationship that maps the plurality of scripts to a plurality of printers. In various embodiments, after accessing the server, the printing appliance receives information associated with the mapping relationship that maps the script to the printer from the server. As an example, the printing appliance obtains information from the printer connected to the printing appliance, wherein the information from the printer includes characteristics of the printer. As an example, after accessing a server, such as server 118, the printing appliance provides the information obtained from the printer to the server. Further, the printing appliance can provide a list of scripts, such as script file 116, to server 118, so that server 118 can determine if an appropriate script for the printer already resides in script file 116. If an appropriate script for the printer already resides in script file 116, server 118 will indicate that to the printing appliance, and optionally, provide information to allow for mapping of the identified script to the printer. Otherwise, server 118 will provide the appropriate script, and optionally the mapping, to the printing appliance.

Note that the description above incorporates use of the phrases "in an aspect," "in an embodiment," or "in various embodiments," or the like, which may each refer to one or more of the same or different embodiments. Furthermore, the terms "comprising," "including," "having," and the like, as used with respect to embodiments of the present disclosure, are synonymous.

As used herein, the terms "logic," "unit," "component," and "module" may refer to, be part of, or include an Application Specific Integrated Circuit (ASIC), system-on-chip (SoC), an electronic circuit, a processor (shared, dedicated, or group) and/or memory (shared, dedicated, or group) that execute one or more software or firmware programs, a combinational logic circuit, and/or other suitable components that provide the described functionality. The logic and functionality described herein may be implemented by any such components.

In accordance with various embodiments, an article of manufacture may be provided that includes a storage medium having instructions stored thereon that, if executed, result in the operations described above. In an embodiment, the storage medium comprises some type of non-transitory memory (not shown). In accordance with various embodiments, the article of manufacture may be a computer-readable medium such as, for example, software or firmware.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

Although the present disclosure describes embodiments having specific structural features and/or methodological acts, it is to be understood that the claims are not necessarily limited to the specific features or acts described.

What is claimed is:

1. A method implemented by a printing appliance, the method comprising:
   receiving, by the printing appliance, a command from a source device, wherein the command from the source device is for performing a print job on a printer connected to the printing appliance;
   determining whether a script used by the printing appliance to perform the print job on the printer is mapped to the printer;
   in response to determining that the script used by the printing appliance to perform the print job is not mapped to the printer:
      accessing a server to (i) obtain, from the server, the script used by the printing appliance to perform the print job on the printer or (ii) identify the script stored on the printing appliance used by the printing appliance to perform the print job on the printer; and
      updating a mapping relationship, wherein the mapping relationship maps the script to the printer.

2. The method of claim 1, wherein the command received from the source device is a wireless command that is wirelessly received by the printing appliance.

3. The method of claim 1, wherein the printing appliance is discoverable on a local network.

4. The method of claim 1, wherein the mapping relationship is stored on the printing appliance.

5. The method of claim 1, further comprising in response to determining that the script used by the printing appliance is mapped to the printer, identifying the script used by the printing appliance to perform the print job on the printer.

6. The method of claim 1, wherein the printing appliance receives, from the server, information associated with the mapping relationship that maps the script to the printer.

7. The method of claim 1, wherein:
   the printing appliance stores a plurality of scripts; and
   the printing appliance stores the mapping relationship that maps the plurality of scripts to a plurality of printers.

8. The method of claim 1, further comprising obtaining, by the printing appliance, information from the printer connected to the printing appliance, wherein the information from the printer includes characteristics of the printer.

9. The method of claim 1, further comprising providing, by the printing appliance, the information to the server.

10. The method of claim 1, further comprising determining whether a script used by the printing appliance to perform the print job on the printer is mapped to the source device.

11. The method of claim 1, wherein accessing a server to (i) obtain, from the server, the script used by the printing appliance to perform the print job on the printer further comprises determining whether there are errors within the script.

12. The method of claim 11, further comprising in response to determining that there are errors within the script, notifying the server of the errors within the script.

13. A printing appliance comprising:
   a first component configured to obtain information from a printer connected to the printing appliance;
   a second component configured to receive a command from a source device, wherein the command from the source device is for performing a print job on a printer connected to the printing appliance;

a third component configured to, based at least in part on the information obtained from the printer, determine whether the printer is known by the printing appliance;

a fourth component configured to, in response to determining that the printer is not known by the printing appliance:

access a server to (i) obtain, from the server, a script used by the printing appliance to generate output on the printer or (ii) identify the script used by the printing appliance to generate output on the printer; and update a mapping relationship, wherein the mapping relationship maps the script and the printer; and a fifth component configured to determine whether the script is mapped to the source device.

14. The printing appliance of claim 13, wherein the mapping relationship contains logic for identifying the script.

15. The printing appliance of claim 13, wherein:

the obtained information from the printer includes characteristics of the printer;

the printing appliance stores a plurality of scripts in a script file; and the printing appliance provides (i) the obtained information from the printer and (ii) the script file to the server.

16. A printing appliance comprising:

a first component configured to obtain information from a printer connected to the printing appliance;

a second component configured to receive a command from a source device, wherein the command from the source device is to perform a print job on the printer connected to the printing appliance;

a third component configured to, determine, based at least in part on the information obtained from the printer, whether a script used by the printing appliance to perform the print job on the printer is at least one of (i) resident on the printing appliance or (ii) mapped to the printer;

a fourth component configured to, in response to determining that the script used to perform the print job is not at least one of (i) resident on the printing appliance or (ii) mapped to the printer:

access a server to (i) obtain, from the server, the script used by the printing appliance to perform the print job on the printer or (ii) identify the script used by the printing appliance to perform the print job on the printer; and update a mapping relationship between the script and the printer, wherein the mapping relationship is to map the script to the printer; and a fifth component configured to determine whether the script is mapped to the source device.

17. The printing appliance of claim 16, further comprising a sixth component configured to provide the information obtained from the printer to the server.

18. The printing appliance of claim 16, wherein the identified script used by the printing appliance to generate output on the printer is stored on the printing appliance prior to the access of the server.

19. The printing appliance of claim 16, wherein the mapping relationship contains logic for identifying the script.

20. The printing appliance of claim 16, wherein:

the obtained information from the printer includes characteristics of the printer;

the printing appliance stores a plurality of scripts in a script file; and the printing appliance provides (i) the obtained information from the printer and (ii) the script file to the server.

* * * * *